United States Patent
Alatawi

(10) Patent No.: US 10,378,788 B1
(45) Date of Patent: Aug. 13, 2019

(54) WIND SCAVENGER

(71) Applicant: Ibrahim Alatawi, Hail (SA)

(72) Inventor: Ibrahim Alatawi, Hail (SA)

( * ) Notice: Subject to any disclaimer, the term of this patent is extended or adjusted under 35 U.S.C. 154(b) by 0 days.

(21) Appl. No.: 16/388,483

(22) Filed: Apr. 18, 2019

Related U.S. Application Data

(60) Provisional application No. 62/795,361, filed on Jan. 22, 2019.

(51) Int. Cl.
| | | |
|---|---|---|
| *F24F 13/28* | (2006.01) | |
| *B01D 46/00* | (2006.01) | |
| *B01D 46/28* | (2006.01) | |
| *B01D 46/18* | (2006.01) | |

(52) U.S. Cl.
CPC .......... *F24F 13/28* (2013.01); *B01D 46/0057* (2013.01); *B01D 46/18* (2013.01); *B01D 46/28* (2013.01)

(58) Field of Classification Search
CPC ..... F24F 13/28; B01D 46/0057; B01D 46/28; B01D 46/18
See application file for complete search history.

(56) References Cited

FOREIGN PATENT DOCUMENTS

| CN | 201454300 U | * | 5/2010 | .............. F24F 13/28 |
| CN | 205026910 U | * | 2/2016 | .............. F24F 13/28 |

* cited by examiner

*Primary Examiner* — Robert A Hopkins
(74) *Attorney, Agent, or Firm* — Barry Choobin; Patent 360

(57) ABSTRACT

A wind scavenger including a frame, a litter collection unit, a lower gear-wheel assembly, an upper gear-wheel assembly, a net element, and a fan system is provided. The litter collection unit is attached to a base member of the frame. The litter collection unit includes a receptacle for collecting litter. The net element includes flexibly jointed plates for catching the litter blown by wind. The fan system is connected to the upper gear-wheel assembly via a power transmission system. The fan system, in communication with the wind, rotates the upper gear-wheel assembly and in turn rotates the net element around the upper gear-wheel assembly and the lower gear-wheel assembly and vice versa. The rotation of the net element from the upper gear-wheel assembly to the lower gear-wheel assembly conveys the litter caught by the flexibly jointed plates of the net element into the receptacle of the litter collection unit.

14 Claims, 10 Drawing Sheets

WIND SCAVENGER

CROSS-REFERENCE TO RELATED APPLICATIONS

This application claims priority to and the benefit of the provisional patent application titled "Wind Scavenger", application No. 62/795,361, filed in the United States Patent and Trademark Office on Jan. 22, 2019. The specification of the above referenced patent application is incorporated herein by reference in its entirety.

BACKGROUND

Technical Field

The apparatus disclosed herein, in general, relates to a net for collecting litter blown by wind. More particularly, the apparatus disclosed herein relates to a wind scavenger comprising a net element with flexibly jointed plates rotated around gear-wheel assemblies, and a litter collection unit, for catching, collecting, and storing litter blown by wind.

Description of the Related Art

Waste generation is on the rise and drives pollution and contamination of the environment. Strong winds typically blow litter comprising, for example, waste, lightweight items such as plastic items, and other contaminants from multiple locations, for example, landfill sites, open garbage cans, etc., onto nearby roadways and surrounding areas. Lightweight litter is typically dispersed into the surrounding environment by wind and rain, if not properly secured during storage and transit. In addition to pollution, the dispersed litter may also cause harm to humans and animals. Moreover, litter blown into water systems contaminates the water. The contaminated water damages surrounding plant life and may cause health issues when ingested by animals and birds. Even humans are not immune to the risks associated with plastic litter. For example, plastics release chemicals which are absorbed into the bodies of fish that are consumed by humans, animals, and birds.

The handling, storage, and disposal of litter have adverse effects on humans, animals, birds, and the surrounding environment, if not properly managed. Landfill operators face increasing problems with wind-blown litter. Wind-blown litter causes complaints from neighbors and regulatory agencies and increases labor costs in scavenging operations. Landfill operators take several precautions to control wind-blown litter. However, with any lapse of these precautions, strong winds can disperse the litter far beyond landfill boundaries. Some landfill operators use stationary fencing around the perimeter of a landfill site to control wind-blown litter. This fencing is stationary and cannot be moved to adjust to changing site and wind conditions. Moreover, as the wind may blow the litter in any direction, this fencing may not be positioned in an appropriate location to face the wind-blown litter and thereby cannot effectively control the litter blown by the wind from different directions. Other conventional meshes comprising fabric netting used to catch wind-blown litter are immovable and require manual removal of the litter caught in the fabric netting. Moreover, as these meshes may not be able to restrain the litter for an extended time period, strong winds may blow away the litter caught in these meshes, if labor resources are not provided for instant removal and collection of the litter. Furthermore, if the collected litter is not instantly removed and is left open in garbage collection units, animals may easily access and ingest the collected litter or further spread the litter to surrounding areas.

Hence, there is a long-felt need for a wind scavenger comprising a net element with flexibly jointed plates and a method for optimally catching, collecting, and scavenging litter blown by wind, where the net element is rotated around gear-wheel assemblies for conveying the caught litter to a litter collection unit. Moreover, there is a need for a wind scavenger and a method for receiving and confining the caught litter in the litter collection unit, thereby precluding the litter from exiting the litter collection unit and further scattering in surrounding areas. Furthermore, there is a need for a wind scavenger and a method for removing the litter lodged in the net element, thereby ensuring that residual litter is collected and stored in the litter collection unit and not blown back into the wind.

SUMMARY

This summary is provided to introduce a selection of concepts in a simplified form that are further disclosed in the detailed description. This summary is not intended to determine the scope of the claimed subject matter.

The wind scavenger and the method disclosed herein address the above-recited need for optimally catching, collecting, and scavenging litter blown by wind. The wind scavenger disclosed herein can be removably positioned at any location. The wind scavenger disclosed herein comprises a frame, a litter collection unit, a lower gear-wheel assembly, an upper gear-wheel assembly, a net element, and a fan system. The frame comprises a base member and elongate support members. The elongate support members extend upwardly and perpendicularly from opposing ends of the base member. The litter collection unit is attached to the base member of the frame. The litter collection unit comprises a receptacle for partially housing a lower gear-wheel assembly and collecting litter conveyed by the net element. The lower gear-wheel assembly is operably connected to lower ends of the elongate support members. The upper gear-wheel assembly is operably connected to upper ends of the elongate support members.

The net element of the wind scavenger is positioned to face a direction of the wind. The net element is positioned to engage with and surround the upper gear-wheel assembly and the lower gear-wheel assembly. The net element rotates from the upper gear-wheel assembly to the lower gear-wheel assembly and vice versa by rotation of the upper gear-wheel assembly and the lower gear-wheel assembly. The net element comprises flexibly jointed plates arranged along a body of the net element for catching the litter blown by the wind. The fan system is positioned on an extended upper end of one of the elongate support members. The fan system is operably connected to the upper gear-wheel assembly via a power transmission system for rotating the upper gear-wheel assembly and in turn rotating the net element around the upper gear-wheel assembly and the lower gear-wheel assembly, in communication with the wind. The rotation of the net element from the upper gear-wheel assembly to the lower gear-wheel assembly conveys the litter caught by the flexibly jointed plates of the net element into the receptacle of the litter collection unit.

In an embodiment, the wind scavenger disclosed herein further comprises a brush element positioned at an entry side of the receptacle of the litter collection unit where the net element enters. The brush element receives and confines the litter in the litter collection unit, thereby precluding the litter from exiting the litter collection unit and further scattering in surrounding areas. The brush element allows entry of litter into the receptacle of the litter collection unit and precludes exit of the litter from the receptacle of the litter collection unit. In another embodiment, the wind scavenger disclosed herein further comprises extended teeth positioned at an exit side of the receptacle of the litter collection unit where the net element exits. The extended teeth comprise a space between the extended teeth for receiving the flexibly jointed plates of the net element, removing the litter lodged in the flexibly jointed plates of the net element, and pushing the removed litter into the receptacle of the litter collection unit, thereby ensuring that residual litter is collected and stored in the litter collection unit and not blown back into the wind. In another embodiment, the wind scavenger further comprises a gate positioned at a side of the litter collection unit for allowing periodic removal of the collected litter from the receptacle of the litter collection unit.

BRIEF DESCRIPTION OF THE DRAWINGS

The foregoing summary, as well as the following detailed description, is better understood when read in conjunction with the appended drawings. For illustrating the apparatus and the method disclosed herein, exemplary constructions of the apparatus and the method are shown in the drawings. However, the apparatus and the method disclosed herein are not limited to the specific structures and methods disclosed herein. The description of a structure or a method step referenced by a numeral in a drawing is applicable to the description of that structure or method step shown by that same numeral in any subsequent drawing herein.

DETAILED DESCRIPTION

Figure 1:
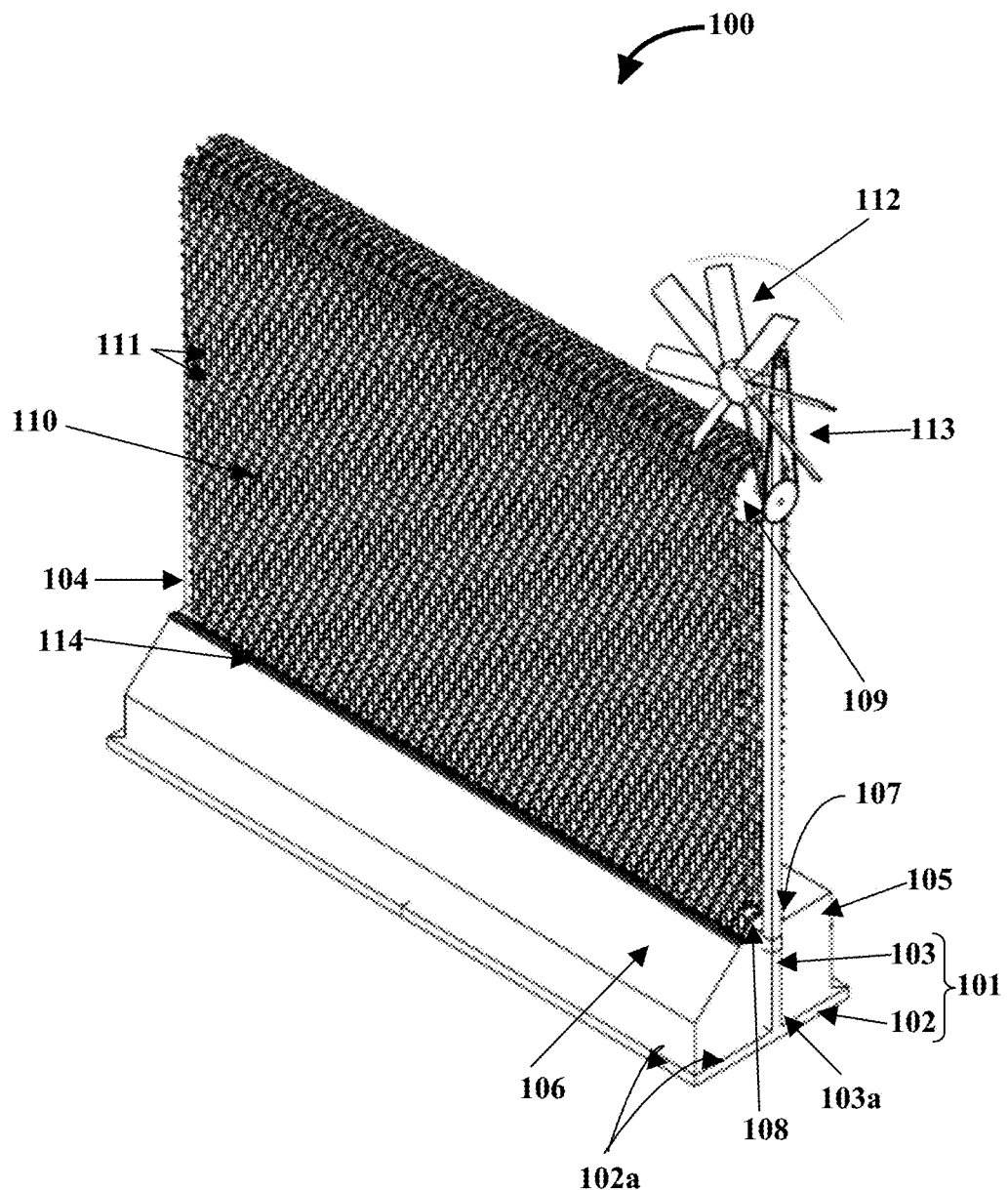
FIG. 1 exemplarily illustrates a front perspective view of a wind scavenger for scavenging litter blown by wind.

FIG. 1 exemplarily illustrates a front perspective view of a wind scavenger 100 for scavenging litter, for example, paper, plastic items, leaves, foil, fabrics, etc., and other lightweight litter that can be carried and blown by wind. The wind scavenger 100 disclosed herein can be removably positioned at any location to face a direction of the wind. The wind scavenger 100 can be used, for example, around airports, or can be installed as a standalone device in remote outdoor locations for collecting garbage and other litter. The wind scavenger 100 disclosed herein comprises a frame 101, a litter collection unit 105, a lower gear-wheel assembly 108, an upper gear-wheel assembly 109, a net element 110, and a fan system 112. The frame 101 comprises a base member 102 and elongate support members 103 and 104 as disclosed in the detailed description of FIG. 2A. The dimensions of the base member 102 are, for example, about 1.5 meters at the sides and about 5 meters at the front and the back, while the heights of the elongate support members 103 and 104 are, for example, about 5 meters and about 4 meters respectively. The dimensions of the base member 102 and the elongate support members 103 and 104 are proportional to the dimensions of the net element 110. In an embodiment as exemplarily illustrated in FIG. 1, the base member 102 of the frame 101 is a rectangular panel that can be positioned on a surface. The frame 101 is, for example, made of welded steel to provide rigidity and stability to the wind scavenger 100.

The litter collection unit 105 is attached to the base member 102 of the frame 101. In an embodiment, the litter collection unit 105 is welded to the inner sides 102a of the base member 102 and to the lower parts 103a and 104a of the support members 103 and 104 respectively, as exemplarily illustrated in FIGS. 1-2. The litter collection unit 105 can be of any shape, for example, a cuboidal shape or a partial cuboidal shape with a side gate 106 inclined with respect to the base member 102 of the frame 101 as exemplarily illustrated in FIG. 1. The litter collection unit 105 is, for example, made of sheet metal. The litter collection unit 105 comprises a receptacle 107 for partially housing the lower gear-wheel assembly 108 and collecting the litter conveyed by the net element 110. In an embodiment, the gate 106 of the wind scavenger 100 is positioned at a side of the litter collection unit 105 for allowing periodic removal of the collected litter from the receptacle 107 of the litter collection unit 105.

The net element 110 is positioned to face a direction of the wind. The net element 110 is positioned to engage with and surround the upper gear-wheel assembly 109 and the lower gear-wheel assembly 108. The net element 110 is, for example, made of lightweight metal or plastic. The net element 110 is configured to rotate from the upper gear-wheel assembly 109 to the lower gear-wheel assembly 108 and vice versa by rotation of the upper gear-wheel assembly 109 and the lower gear-wheel assembly 108. The net element 110 maintains a fixed length and a fixed width under high wind speed. The width and the height of the net element 110 are, for example, about 4.5 meters and about 3 meters respectively. The net element 110 comprises flexibly jointed plates 111 arranged along a body of the net element 110 for catching the litter blown by the wind. The flexibly jointed plates 111 are aligned adjacent to upper gear wheels 109b of the upper gear-wheel assembly 109 and lower gear wheels 108b of the lower gear-wheel assembly 108 as exemplarily illustrated in FIGS. 5C-5D. The alignment of the flexibly jointed plates 111 of the net element 110 ensures engagement of the flexible joint members 111c with the upper gear wheels 109b exemplarily illustrated in FIG. 5D, the rotation of which rotates the net element 110. The engagement of the flexible joint members 111c with the lower gear wheels 108b of the lower gear-wheel assembly 108 exemplarily illustrated in FIG. 5C, ensures a smooth rotation of the net element 110. The net element 110 intercepts and catches the litter blown by the wind and pushes the litter into the litter collection unit 105 positioned under the net element 110.

Figures 5A, 5B:
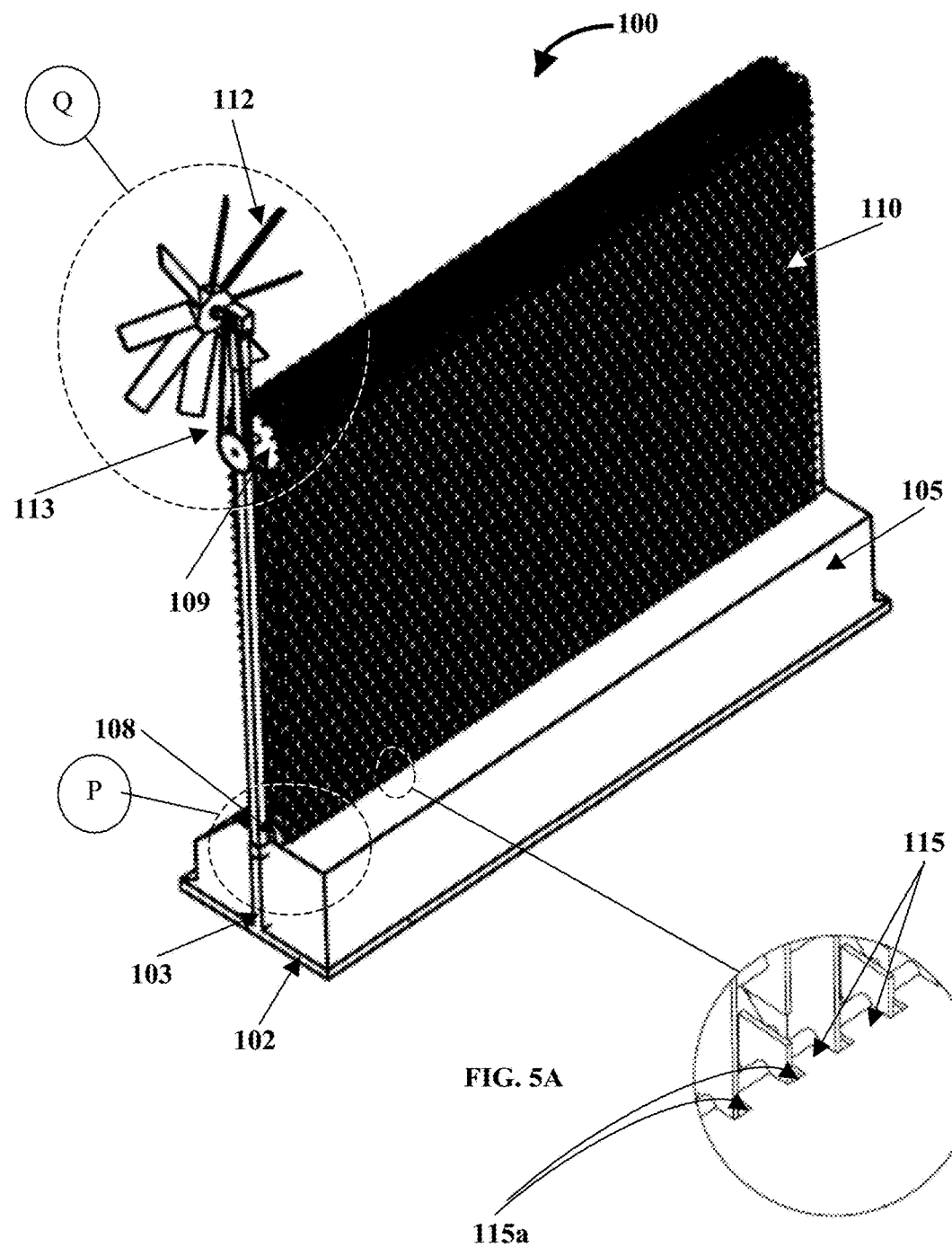
FIG. 5A exemplarily illustrates a rear perspective view of the wind scavenger.
FIG. 5B exemplarily illustrates an enlarged view showing extended teeth of the wind scavenger.
Figure 5C:
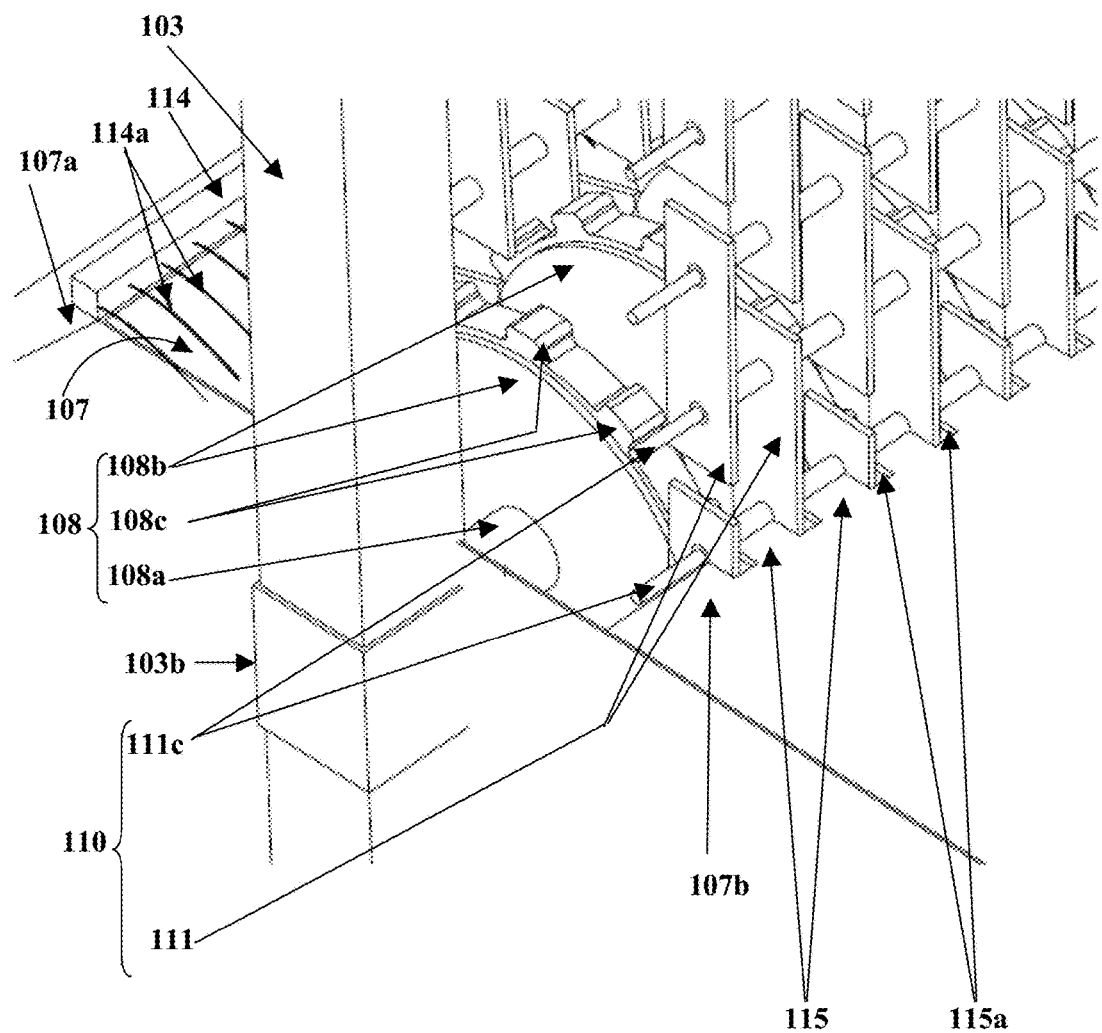
FIG. 5C exemplarily illustrates an enlarged view of a portion marked P of the wind scavenger shown in FIG. 5A.
Figure 5D:
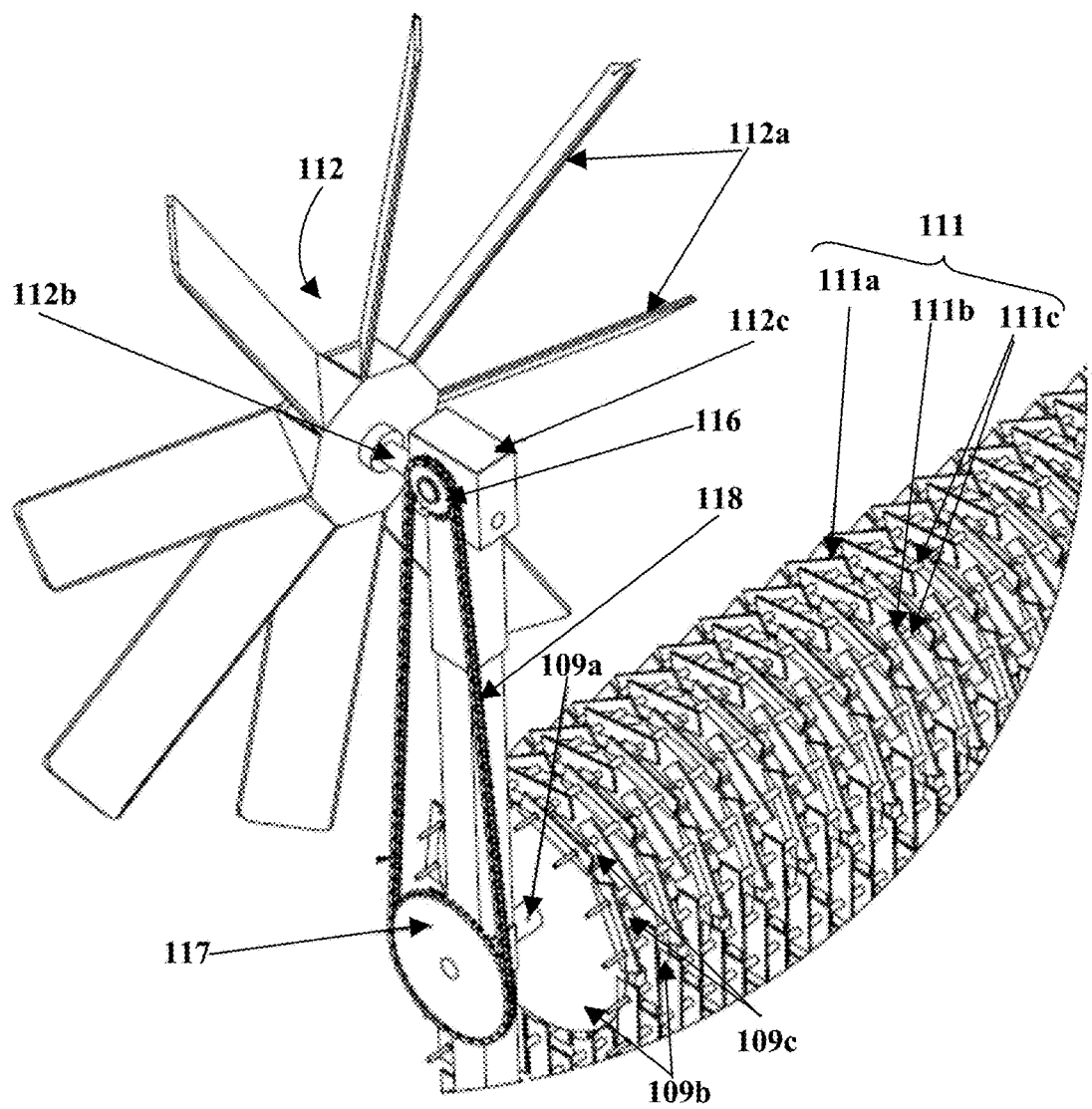
FIG. 5D exemplarily illustrates an enlarged view of a portion marked Q of the wind scavenger shown in FIG. 5A.

The fan system 112 is operably connected to the upper gear-wheel assembly 109 via a power transmission system 113 as disclosed in the detailed description of FIG. 5D. Wind energy activates the fan system 112. In communication with the wind, the fan system 112 rotates the upper gear-wheel assembly 109 and in turn rotates the net element 110 around the upper gear-wheel assembly 109 and the lower gear-wheel assembly 108 as disclosed in the detailed description of FIG. 5D. The rotation of the net element 110 from the upper gear-wheel assembly 109 to the lower gear-wheel assembly 108 conveys the litter caught by the flexibly jointed plates 111 of the net element 110 into the receptacle 107 of the litter collection unit 105. Through the rotation of the net element 110, the wind scavenger 100 self-cleans the litter and collects the litter in the receptacle 107 of the litter collection unit 105. In an embodiment, the wind scavenger 100 comprises a brush element 114 positioned proximal to the receptacle 107 of the litter collection unit 105 as disclosed in the detailed description of FIG. 2C and FIG. 5C.

The wind scavenger 100 disclosed herein can be configured in different sizes depending on the litter collection requirements. The sizes of the parts, for example, the frame 101, the litter collection unit 105, the lower gear-wheel assembly 108, the upper gear-wheel assembly 109, the brush element 114, the fan system 112, etc., are proportional to the size of the net element 110 and can be scaled up or down based on the requirements. For example, a net element 110 of a large size requires more power to be transmitted by the fan system 112 for catching a substantial amount of litter, and therefore a large sized fan system 112 is provided in the wind scavenger 100. Accordingly, a large sized litter collection unit 105 is provided in the wind scavenger 100 for collecting and storing the substantial amount of litter.

Figure 2A:
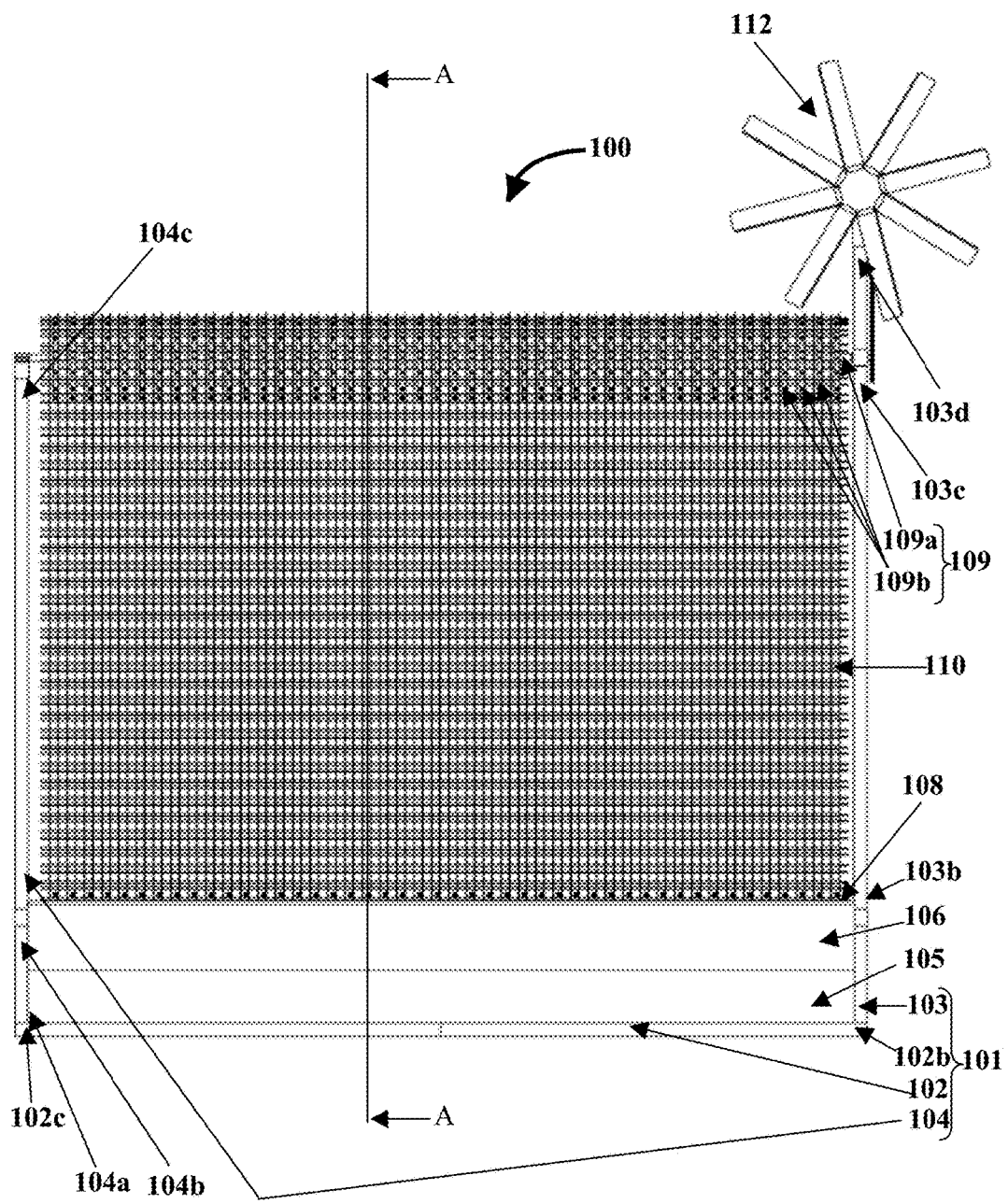
FIG. 2A exemplarily illustrates a front elevation view of the wind scavenger.

FIG. 2A exemplarily illustrates a front elevation view of the wind scavenger 100. As exemplarily illustrated in FIG. 2A, the elongate support members 103 and 104 of the frame 101 of the wind scavenger 100 extend upwardly and perpendicularly from opposing ends 102b and 102c of the base member 102 of the frame 101 respectively. In an embodiment, the elongate support members 103 and 104 are soldered or welded to the opposing ends 102b and 102c of the base member 102. The lower gear-wheel assembly 108 is operably connected to lower ends 103b and 104b of the elongate support members 103 and 104 of the frame 101 respectively. The upper gear-wheel assembly 109 is operably connected to upper ends 103c and 104c of the elongate support members 103 and 104 of the frame 101 respectively. In an embodiment, the upper gear-wheel assembly 109 comprises an upper axial shaft 109a and multiple upper gear wheels 109b positioned along a length of the upper axial shaft 109a. The upper axial shaft 109a is operably connected to the upper ends 103c and 104c of the elongate support members 103 and 104 respectively. In an embodiment, the upper axial shaft 109a is rotatably connected to the upper ends 103c and 104c of the elongate support members 103 and 104 respectively, to allow axial rotation of the upper gear wheels 109b along a length of the upper axial shaft 109a. The fan system 112 is positioned on an extended upper end 103d of one of the elongate support members, for example, the right elongate support member 103. In an embodiment (not shown), the fan system 112 is operably positioned on the left elongate support member 104.

Figure 2B:
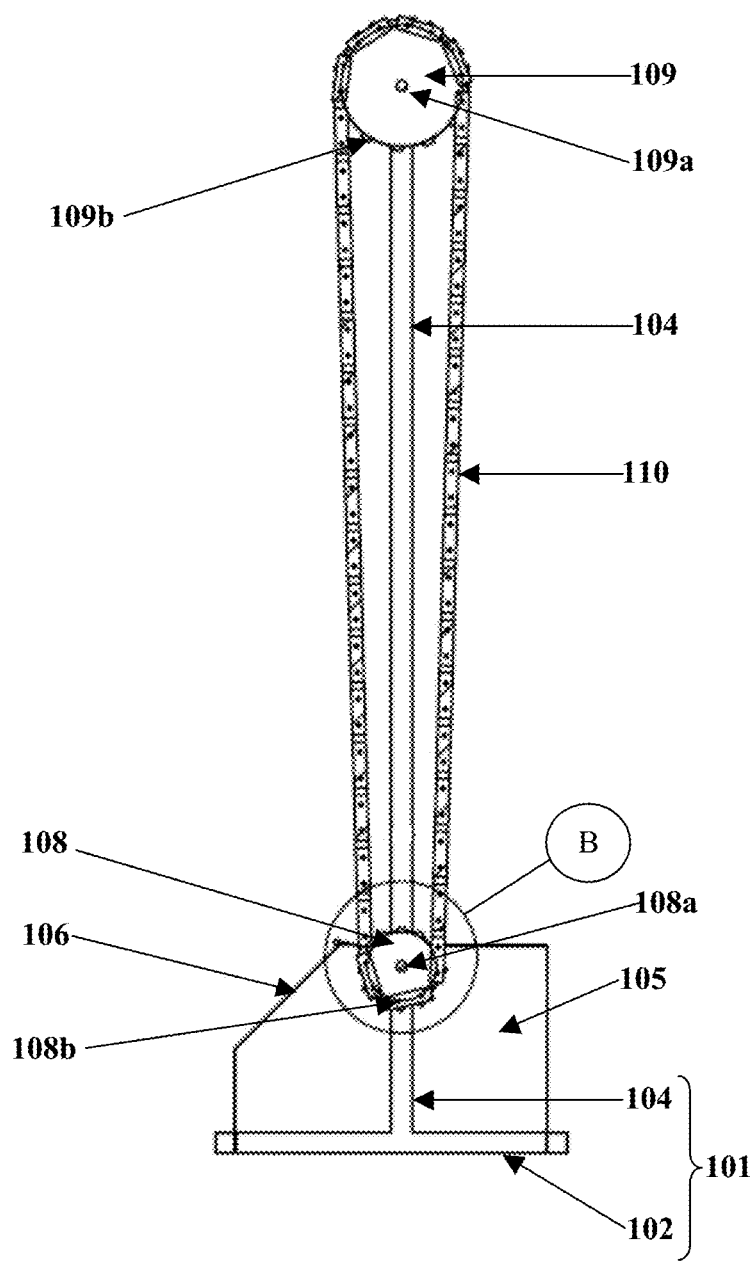
FIG. 2B exemplarily illustrates a sectional view of the wind scavenger, taken along the section A-A shown in FIG. 2A.

FIG. 2B exemplarily illustrates a sectional view of the wind scavenger 100, taken along the section A-A shown in FIG. 2A. The sectional view exemplarily illustrated in FIG. 2B, shows the net element 110 extending from the upper gear-wheel assembly 109, towards the lower gear-wheel assembly 108, and back upwards towards the upper gear-wheel assembly 109 in a belt configuration or a loop configuration.

Figure 2C:
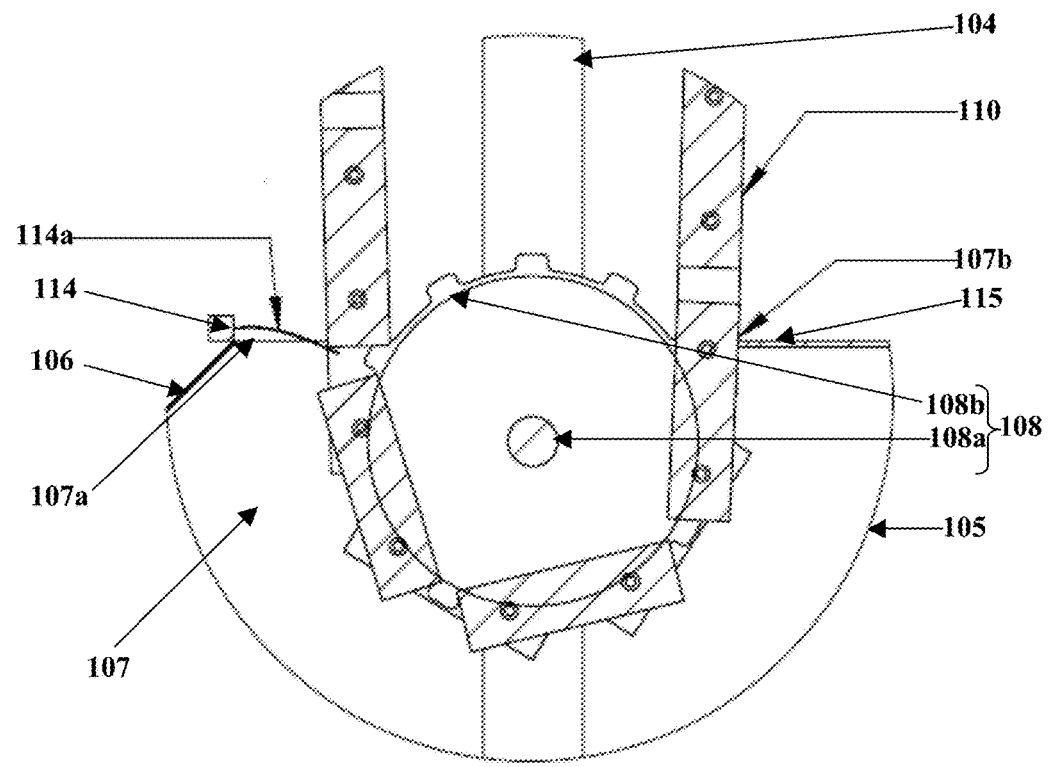
FIG. 2C exemplarily illustrates an enlarged view of a portion marked B of the wind scavenger shown in FIG. 2B.

FIG. 2C exemplarily illustrates an enlarged view of a portion marked B of the wind scavenger 100 shown in FIG. 2B. As exemplarily illustrated in FIG. 2C, the brush element 114 of the wind scavenger 100 exemplarily illustrated in FIG. 1, is positioned at an entry side 107a of the receptacle 107 of the litter collection unit 105 where the net element 110 enters. The brush element 114 comprises bristles 114a for receiving and confining the litter in the litter collection unit 105. The brush element 114 is, for example, made of plastic. The brush element 114 is installed where the net element 110 enters the receptacle 107 of the litter collection unit 105, thereby allowing the litter to enter the litter collection unit 105 and precluding the litter from exiting the litter collection unit 105. In an embodiment, the wind scavenger 100 further comprises extended teeth 115 positioned at an exit side 107b of the receptacle 107 of the litter collection unit 105 where the net element 110 exits, as disclosed in the detailed description of FIGS. 5B-5C.

Figure 3:
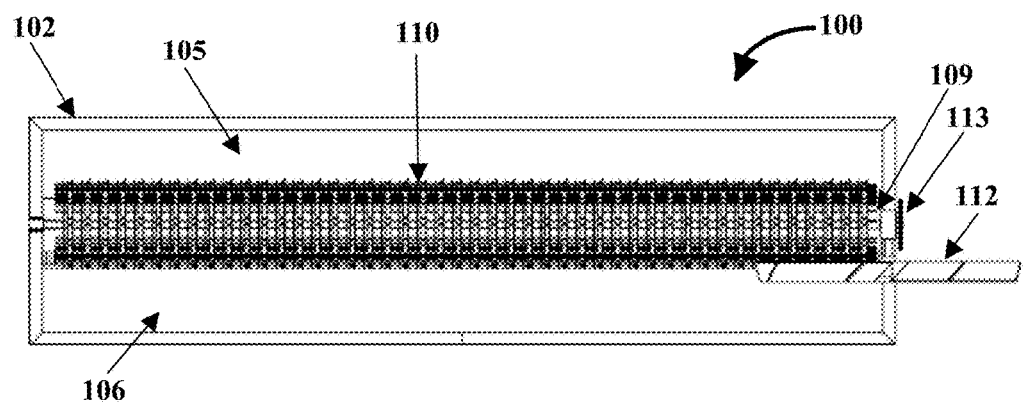
FIG. 3 exemplarily illustrates a top plan view of the wind scavenger.
Figure 4:
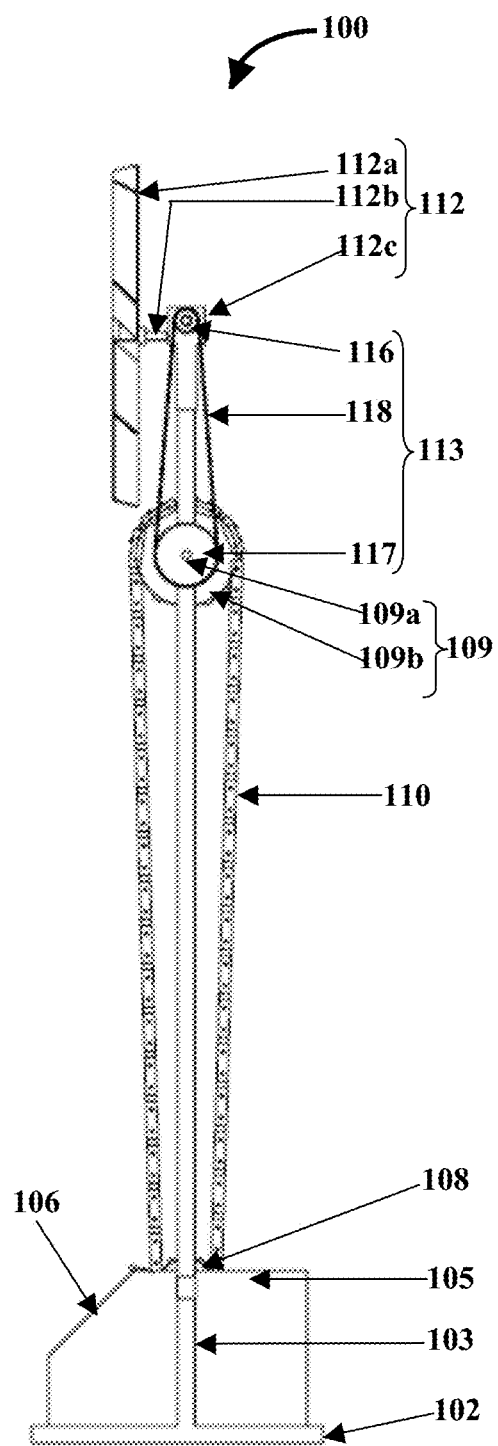
FIG. 4 exemplarily illustrates a right-side elevation view of the wind scavenger.

FIGS. 3-4 exemplarily illustrate a top plan view and a right-side elevation view of the wind scavenger 100 respectively. As exemplarily illustrated in FIG. 3, the fan system 112 of the wind scavenger 100 is operably connected to the upper gear-wheel assembly 109 via the power transmission system 113 as disclosed in the detailed description of FIG. 5D. The power transmission system 113 comprises a first sprocket 116, a second sprocket 117, and a drive chain 118 as exemplarily illustrated in FIG. 4 and as disclosed in the detailed description of FIG. 5D.

FIG. 5A exemplarily illustrates a rear perspective view of the wind scavenger 100. As exemplarily illustrated in FIG. 5A, the net element 110 extends from the upper gear-wheel assembly 109, towards the lower gear-wheel assembly 108, and back upwards towards the upper gear-wheel assembly 109 in a belt configuration or a loop configuration. The amount of wind-blown litter caught by the net element 110 depends on the area of the net element 110 and the quantity of litter passing through that area of the net element 110. The collected litter can be removed from the receptacle 107 of the litter collection unit 105 as needed or periodically to preclude jamming of the net element 110 by the collected litter. The litter collection unit 105 stores the collected litter until the collected litter is removed.

FIG. 5B exemplarily illustrates an enlarged view showing the extended teeth 115 of the wind scavenger 100. As disclosed in the detailed description of FIG. 2C, the extended teeth 115 are positioned where the net element 110 exits from the receptacle 107 of the litter collection unit 105. The dimensions of the extended teeth 115 are proportional to the dimensions of the net element 110. The extended teeth 115 interfere with the net element 110 to scratch any litter lodged between the flexibly jointed plates 111 of the net element 110 and convey the litter into the receptacle 107 of the litter collection unit 105 exemplarily illustrated in FIG. 2C, for storage in the litter collection unit 105. The extended teeth 115 comprise a space 115a between the extended teeth 115 as disclosed in the detailed description of FIG. 5C.

FIG. 5C exemplarily illustrates an enlarged view of a portion marked P of the wind scavenger 100 shown in FIG. 5A. As exemplarily illustrated in FIG. 5C, the spaces 115a between the extended teeth 115 of the wind scavenger 100 receive the flexibly jointed plates 111 of the net element 110 during rotation of the net element 110 from the lower gear-wheel assembly 108 to the upper gear-wheel assembly 109. Moreover, the spaces 115a between the extended teeth 115, in communication with the flexibly jointed plates 111 of the net element 110, remove the litter lodged in the flexibly jointed plates 111 and push the removed litter into the receptacle 107 of the litter collection unit 105. Also shown in FIG. 5C is the brush element 114 comprising the bristles 114a positioned at the entry side 107a of the receptacle 107 of the litter collection unit 105 for precluding litter from exiting the litter collection unit 105 as disclosed in the detailed description of FIG. 2C. Also shown in FIG. 5C is the lower gear-wheel assembly 108 comprising a lower axial shaft 108a and multiple lower gear wheels 108b positioned along a length of the lower axial shaft 108a. The lower axial shaft 108a is operably connected to the lower ends 103b and 104b of the elongate support members 103 and 104 respectively. In an embodiment, the lower axial shaft 108a is rotatably connected to the lower ends 103b and 104b of the elongate support members 103 and 104 respectively, to allow axial rotation of the lower gear wheels 108b.

FIG. 5D exemplarily illustrates an enlarged view of a portion marked Q of the wind scavenger 100 shown in FIG. 5A. The wind scavenger 100 disclosed herein utilizes wind energy to activate the fan system 112 and rotate the net element 110. The fan system 112 is configured, for example, as a wind turbine or a wind energy converter that facilitates conversion of the wind energy into electrical energy. The fan system 112 comprises fan blades 112a, a shaft 112b, and a gear box 112c. The wind energy rotates the fan blades 112a. The rotational energy of the fan blades 112a is transmitted to the gear box 112c via the shaft 112b for generation of mechanical energy. The mechanical energy generated by the fan system 112 powers the power transmission system 113. When the wind activates the fan system 112, the fan system 112 activates the power transmission system 113 of the wind scavenger 100.

In an embodiment as exemplarily illustrated in FIG. 5D, the power transmission system 113 comprises the first sprocket 116, the second sprocket 117, and the drive chain 118. The gear box 112c of the fan system 112 drives the first sprocket 116 that meshes with the drive chain 118 to transmit rotational energy of the first sprocket 116 to the second sprocket 117, thereby rotating the second sprocket 117. The second sprocket 117 is rigidly connected to the upper axial shaft 109a of the upper gear-wheel assembly 109. The rotation of the second sprocket 117 causes rotation of the upper axial shaft 109a and in turn rotates the upper gear wheels 109b of the upper gear-wheel assembly 109, thereby inducing rotation of the net element 110 positioned around the upper gear wheels 109b of the upper gear-wheel assembly 109. The rotation of the net element 110 around the upper gear wheels 109b of the upper gear-wheel assembly 109 facilitates the rotation of the net element 110 towards the lower gear wheels 108b of the lower gear-wheel assembly 108 exemplarily illustrated in FIG. 5C, and thereafter back upwards towards the upper gear-wheel assembly 109 for another rotation cycle. In various embodiments, different power transmission systems known in the art can be used for rotating the net element 110 from the upper gear-wheel assembly 109, towards the lower gear-wheel assembly 108, and back upwards towards the upper gear-wheel assembly 109, upon activation of the fan system 112 by wind energy.

Figure 5E:
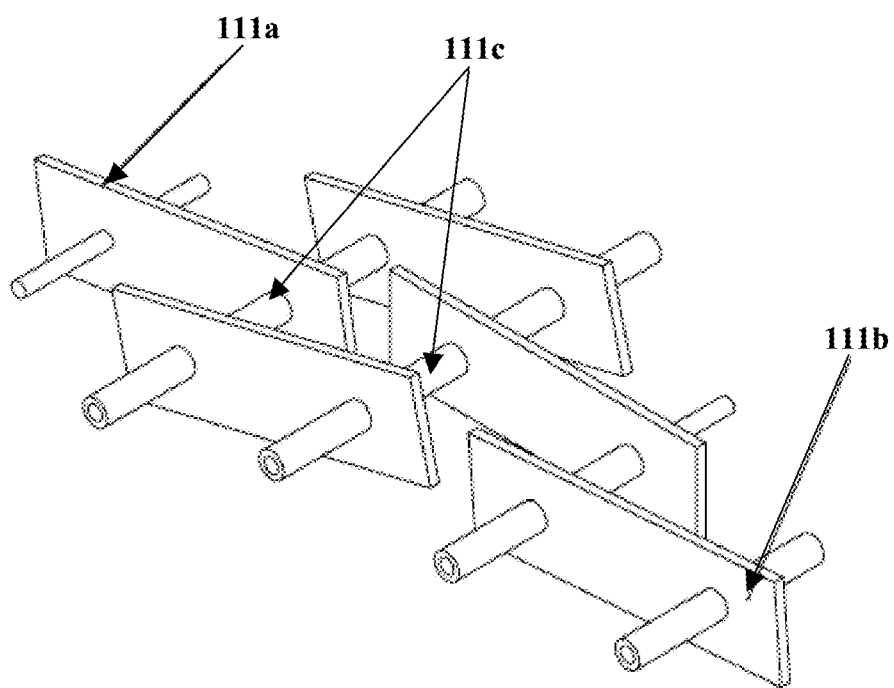
FIG. 5E exemplarily illustrates an enlarged view showing flexibly jointed plates of a net element of the wind scavenger.

FIG. 5E exemplarily illustrates an enlarged view showing flexibly jointed plates 111 of the net element 110 of the wind scavenger 100 shown in FIG. 5A. The flexibly jointed plates 111 comprise male plates 111a and female plates 111b connected to each other through flexible joint members 111c. In an embodiment, the male plates 111a and the female plates 111b are rectangular in shape as exemplarily illustrated in FIG. 5E. The flexible joint members 111c are rod-shaped structures that connect the male plates 111a to the female plates 111b. The net element 110 is created by connecting the male plates 111a and the female plates 111b through the flexible joint members 111c that facilitate rotation of the net element 110 around the upper gear-wheel assembly 109 and the lower gear-wheel assembly 108. The flexible joint members 111c engage with teeth 109c of the upper gear wheels 109b as exemplarily illustrated in FIG. 5D, thereby facilitating rotation of the net element 110 when the upper gear wheels 109b rotate. Similarly, the flexible joint members 111c engage with teeth 108c of the lower gear wheels 108b as exemplarily illustrated in FIG. 5C, thereby facilitating rotation of the net element 110 when the lower gear wheels 108b rotate. The engagement of the teeth 109c and 108c of the upper gear wheels 109b and the lower gear wheels 108b respectively, by the flexible joint members 111c facilitate rotation of the net element 110 from the upper gear-wheel assembly 109 to the lower gear-wheel assembly 108 and vice versa. Moreover, the flexibly jointed plates 111 comprising the male plates 111a and the female plates 111b are configured to keep the collected litter away from the base of the net element 110 and at the same time to allow the extended teeth 115 of the wind scavenger 100 to scratch the litter lodged between the flexibly jointed plates 111 of the net element 110.

Figure 6:
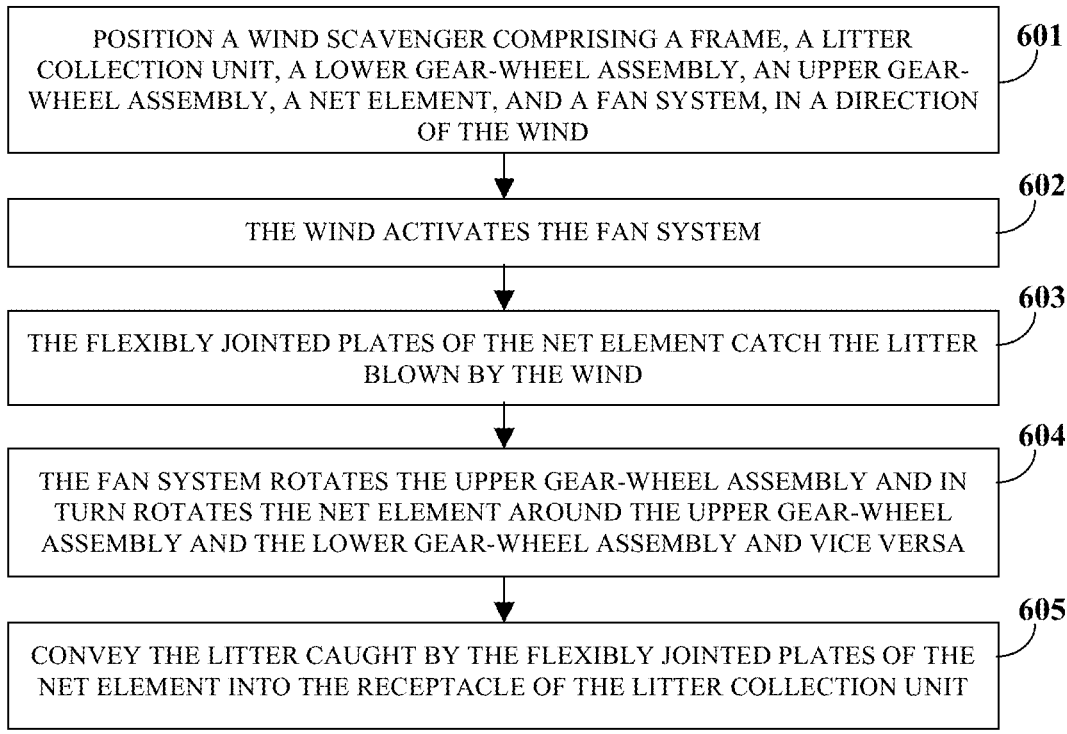
FIG. 6 exemplarily illustrates a method for scavenging litter blown by wind using the wind scavenger.

FIG. 6 exemplarily illustrates a method for scavenging litter blown by wind using the wind scavenger 100 exemplarily illustrated in FIGS. 1-5E. In the method disclosed herein, the wind scavenger 100 comprising the frame 101, the litter collection unit 105, the lower gear-wheel assembly 108, the upper gear-wheel assembly 109, the net element 110, and the fan system 112 as exemplarily illustrated in FIGS. 1-5E and as disclosed in the detailed description of FIGS. 1-5E, for scavenging litter blown by the wind, is positioned 601 in a direction of the wind. The wind scavenger 100 can be positioned, for example, in a fixed location or can be mounted on a trailer to be mobilized or towed by a vehicle, for example, a car to a desired location. The wind scavenger 100 operates based on the location of the wind scavenger 100 and the speed and direction of the wind. The optimal speed of the wind at which the wind scavenger 100 operates is, for example, 25 kilometers per hour (km/hr).

The wind activates 602 the fan system 112 of the wind scavenger 100. The flexibly jointed plates 111 of the net element 110 of the wind scavenger 100 catch 603 the litter blown by the wind. The fan system 112 rotates 604 the upper gear-wheel assembly 109 and in turn rotates the net element 110 around the upper gear-wheel assembly 109 and the lower gear-wheel assembly 108 of the wind scavenger 100 and vice versa. The flexible joint members 111c of the net element 110 engage with the teeth 109c of the upper gear wheels 109b of the upper gear-wheel assembly 109 and with the teeth 108c of the lower gear wheels 108b of the lower gear-wheel assembly 108 as exemplarily illustrated in FIGS. 5C-5D, for facilitating rotation of the net element 110 from the upper gear-wheel assembly 109 to the lower gear-wheel assembly 108 and vice versa. The rotation of the net element 110 from the upper gear-wheel assembly 109 to the lower gear-wheel assembly 108 conveys 605 the litter caught by the flexibly jointed plates 111 of the net element 110 into the receptacle 107 of the litter collection unit 105 of the wind scavenger 100, thereby allowing collection of the litter from the net element 110 and scavenging the litter blown by the wind. The wind scavenger 100 automatically cleans the net element 110 by utilizing mechanical movement of the fan system 112 and the power transmission system 113 to rotate the net element 110. In the absence of wind, the wind scavenger 100 is set to a standby mode. Since the litter collection unit 105 is closed by the gate 106 exemplarily illustrated in FIGS. 1-4, the litter stored in the litter collection unit 105 is hidden from view, thereby disallowing access to the litter, for example, by animals and birds, and precluding scattering of the litter.

The foregoing examples have been provided merely for explanation and are in no way to be construed as limiting of the wind scavenger 100 and the method disclosed herein. While the wind scavenger 100 and the method have been described with reference to various embodiments, it is understood that the words, which have been used herein, are words of description and illustration, rather than words of limitation. Furthermore, although the wind scavenger 100 and the method have been described herein with reference to particular means, materials, and embodiments, the wind scavenger 100 and the method are not intended to be limited to the particulars disclosed herein; rather, the wind scavenger 100 and the method extend to all functionally equivalent structures, methods and uses, such as are within the scope of the appended claims. While multiple embodiments are disclosed, it will be understood by those skilled in the art, having the benefit of the teachings of this specification, that the wind scavenger 100 and the method disclosed herein are capable of modifications and other embodiments may be effected and changes may be made thereto, without departing from the scope and spirit of the wind scavenger 100 and the method disclosed herein.

I claim:

1. A wind scavenger comprising:
    a frame comprising a base member and elongate support members, said elongate support members extending upwardly and perpendicularly from opposing ends of said base member;
    a litter collection unit attached to said base member of said frame, said litter collection unit comprising a receptacle for partially housing a lower gear-wheel assembly and collecting litter conveyed by a net element;
    said lower gear-wheel assembly operably connected to lower ends of said elongate support members;
    an upper gear-wheel assembly operably connected to upper ends of said elongate support members;
    said net element positioned to engage with and surround said upper gear-wheel assembly and said lower gear-wheel assembly, said net element configured to rotate from said upper gear-wheel assembly to said lower gear-wheel assembly and vice versa by rotation of said upper gear-wheel assembly and said lower gear-wheel assembly, said net element comprising flexibly jointed plates arranged along a body of said net element for catching said litter blown by wind; and
    a fan system positioned on an extended upper end of one of said elongate support members, said fan system operably connected to said upper gear-wheel assembly via a power transmission system for rotating said upper gear-wheel assembly and in turn rotating said net element around said upper gear-wheel assembly and said lower gear-wheel assembly in communication with said wind, wherein said rotation of said net element from said upper gear-wheel assembly to said lower gear-wheel assembly conveys said litter caught by said flexibly jointed plates of said net element into said receptacle of said litter collection unit.

2. The wind scavenger of claim 1, further comprising a brush element positioned at an entry side of said receptacle of said litter collection unit where said net element enters, wherein said brush element receives and confines said litter in said litter collection unit.

3. The wind scavenger of claim 1, further comprising extended teeth positioned at an exit side of said receptacle of said litter collection unit where said net element exits, wherein said extended teeth comprise a space between said extended teeth for receiving said flexibly jointed plates of said net element, removing said litter lodged in said flexibly jointed plates of said net element, and pushing said removed litter into said receptacle of said litter collection unit.

4. The wind scavenger of claim 1, further comprising a gate positioned at a side of said litter collection unit for allowing periodic removal of said collected litter from said receptacle of said litter collection unit.

5. The wind scavenger of claim 1, wherein said upper gear-wheel assembly comprises an upper axial shaft and a plurality of upper gear wheels positioned along a length of said upper axial shaft, wherein said upper axial shaft is operably connected to said upper ends of said elongate support members.

6. The wind scavenger of claim 1, wherein said lower gear-wheel assembly comprises a lower axial shaft and a plurality of lower gear wheels positioned along a length of said lower axial shaft, wherein said lower axial shaft is operably connected to said lower ends of said elongate support members.

7. The wind scavenger of claim 1, wherein said flexibly jointed plates of said net element comprise male plates and female plates connected to each other through flexible joint members.

8. The wind scavenger of claim 7, wherein said flexible joint members engage with teeth of upper gear wheels of said upper gear-wheel assembly and with teeth of lower gear wheels of said lower gear-wheel assembly for facilitating rotation of said net element from said upper gear-wheel assembly to said lower gear-wheel assembly and vice versa.

9. The wind scavenger of claim 1, wherein said net element is positioned to face a direction of said wind.

10. The wind scavenger of claim 1 configured to be removably positioned at any location.

11. A method for scavenging litter blown by wind, said method comprising:
    positioning a wind scavenger in a direction of said wind, said wind scavenger comprising:
        a frame comprising a base member and elongate support members, said elongate support members extending upwardly and perpendicularly from opposing ends of said base member;
        a litter collection unit attached to said base member of said frame, said litter collection unit comprising a receptacle for partially housing a lower gear-wheel assembly and collecting said litter conveyed by a net element;
        said lower gear-wheel assembly operably connected to lower ends of said elongate support members;
        an upper gear-wheel assembly operably connected to upper ends of said elongate support members;
        said net element positioned to engage with and surround said upper gear-wheel assembly and said lower gear-wheel assembly, said net element comprising flexibly jointed plates arranged along a body of said net element; and
        a fan system positioned on an extended upper end of one of said elongate support members, said fan system operably connected to said upper gear-wheel assembly via a power transmission system;

activating said fan system of said wind scavenger by said wind;

catching, by said flexibly jointed plates of said net element of said wind scavenger, said litter blown by said wind;

rotating said upper gear-wheel assembly of said wind scavenger by said fan system and in turn rotating said net element around said upper gear-wheel assembly and said lower gear-wheel assembly of said wind scavenger and vice versa; and conveying said litter caught by said flexibly jointed plates of said net element into said receptacle of said litter collection unit of said wind scavenger by said rotation of said net element from said upper gear-wheel assembly to said lower gear-wheel assembly, thereby collecting said litter from said net element and scavenging said litter blown by said wind.

12. The method of claim 11, wherein said wind scavenger further comprises a brush element positioned at an entry side of said receptacle of said litter collection unit where said net element enters, wherein said brush element receives and confines said litter in said litter collection unit.

13. The method of claim 11, wherein said wind scavenger further comprises extended teeth positioned at an exit side of said receptacle of said litter collection unit where said net element exits, wherein said extended teeth comprise a space between said extended teeth for receiving said flexibly jointed plates of said net element, removing said litter lodged in said flexibly jointed plates of said net element, and pushing said removed litter into said receptacle of said litter collection unit.

14. The method of claim 11, wherein said wind scavenger further comprises a gate positioned at a side of said litter collection unit for allowing periodic removal of said collected litter from said receptacle of said litter collection unit.

* * * * *